(12) United States Patent
Wobben

(10) Patent No.: US 7,364,114 B2
(45) Date of Patent: Apr. 29, 2008

(54) AIRCRAFT

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 10/934,634

(22) Filed: Sep. 3, 2004

(65) Prior Publication Data

US 2005/0061910 A1 Mar. 24, 2005

Related U.S. Application Data

(63) Continuation-in-part of application No. PCT/EP03/02210, filed on Mar. 5, 2003.

(30) Foreign Application Priority Data

Mar. 6, 2002 (DE) .................................. 102 09 881

(51) Int. Cl.
*B64C 29/00* (2006.01)
(52) U.S. Cl. ............................... 244/12.3; 244/17.11
(58) Field of Classification Search .............. 244/23 R, 244/17.11, 17.23, 12.1, 12.3, 12.2, 23 B, 244/54; 446/36–38
See application file for complete search history.

(56) References Cited

U.S. PATENT DOCUMENTS

| | | | | |
|---|---|---|---|---|
| 1,246,022 A | * | 11/1917 | Dalton | .................. 244/54 |
| 1,523,926 A | | 1/1925 | Ypma | |
| 1,573,228 A | | 2/1926 | Bothezat | |
| 2,953,321 A | | 9/1960 | Robertson et al. | ............. 244/23 |
| 3,002,712 A | * | 10/1961 | Beckwith | ................. 244/17.23 |
| 3,008,665 A | | 11/1961 | Piasecki | ........................ 244/2 |
| 3,089,666 A | * | 5/1963 | Quenzler | ..................... 244/7 R |
| 3,211,399 A | | 10/1965 | Eickmann | ................ 244/17.23 |
| 3,366,347 A | | 1/1968 | Soulez-Lariviere | .......... 244/23 |
| 3,685,608 A | * | 8/1972 | Hamilton | ..................... 367/189 |
| 3,895,276 A | * | 7/1975 | Brown et al. | ................ 318/811 |
| 4,161,843 A | * | 7/1979 | Hui | ............................. 446/37 |
| 4,269,375 A | * | 5/1981 | Hickey | ......................... 244/26 |
| 4,799,629 A | * | 1/1989 | Mori | ........................ 244/23 C |
| 4,981,456 A | * | 1/1991 | Sato et al. | ..................... 446/36 |
| 5,082,079 A | * | 1/1992 | Lissaman et al. | ........... 180/118 |
| 5,340,057 A | * | 8/1994 | Schmittle | ..................... 244/48 |
| 5,383,810 A | * | 1/1995 | Loving | ......................... 446/57 |
| 5,904,724 A | * | 5/1999 | Margolin | .................... 701/120 |
| 6,260,796 B1 | * | 7/2001 | Klingensmith | ............. 244/23 R |

FOREIGN PATENT DOCUMENTS

| | | |
|---|---|---|
| DE | 449 717 | 9/1927 |
| DE | 1 431 158 | 4/1969 |
| DE | 197 45 492 A1 | 4/1999 |
| DE | 100 45 446 C1 | 10/2001 |
| EP | 0 049 964 A2 | 4/1982 |

(Continued)

*Primary Examiner*—Tien Dinh
(74) *Attorney, Agent, or Firm*—Seed IP Law Group PLLC

(57) ABSTRACT

The present invention concerns an aircraft having a plurality of lifting and thrust rotors, with an electric motor and an inverter for each motor. In order to provide an aircraft having a greater payload, connecting bars are provided between the motors. In that respect the invention is based on the realization that, if such connecting bars are arranged in the manner of a latticework, they can provide a light but nonetheless stable structure for the aircraft, and that structure can carry correspondingly greater loads.

35 Claims, 2 Drawing Sheets

FOREIGN PATENT DOCUMENTS

| | | |
|---|---|---|
| FR | 580 196 | 10/1924 |
| FR | 656 331 | 5/1929 |
| FR | 1 285 250 | 1/1962 |
| FR | 1 427 083 | 12/1965 |
| FR | 2 234 524 | 2/1973 |
| FR | 2 651 139 | 3/1991 |
| GB | 509848 | 7/1939 |
| GB | 725820 | 3/1955 |
| GB | 863685 | 3/1961 |
| GB | 897756 | 5/1962 |
| JP | 2-299998 | 12/1990 |
| JP | 3-32197 | 2/1991 |
| JP | 3-227798 | 10/1991 |
| JP | 11-509758 | 8/1999 |
| JP | 2000-118498 | 4/2000 |
| JP | 2001-119961 | 4/2001 |

\* cited by examiner

AIRCRAFT

BACKGROUND OF THE INVENTION

1. Field of the Invention

This invention relates to an aircraft for lifting heavy loads, and more particularly, to a barge type aircraft with a plurality of electric lifting and thrusting motors that travels only a short distance above the ground.

2. Description of the Related Art

A crane is usually required for erecting high buildings and constructions. That naturally also applies to tower-like buildings such as wind power installations. It will be noted that wind power installations are becoming increasingly larger and this means that the cranes on the one hand must reach ever increasing heights and on the other hand move ever increasing masses. That in turn results in larger and heavier cranes. Those cranes are then in turn more and more expensive and the expenditure for transporting such a crane from one building site to another also rises, as also the expenditure for assembly and dismantling of the crane.

An alternative is an aircraft which is capable of transporting the components of the building or construction, such as for example a wind power installation.

DE 22 34 524 discloses a flying platform with a plurality of lifting and thrust rotors, with an electric motor for each rotor and an inverter for each motor.

A disadvantage with that known aircraft however is that the electric motors are mounted to a common platform. That platform on the one hand is of a high inherent weight and, due to the construction involved, predetermines the possible numbers of motors and rotors respectively.

BRIEF SUMMARY OF THE INVENTION

Therefore one object of the invention is to provide an aircraft able to carry a heavier payload than prior similar barge-type aircraft.

In the aircraft in accordance with the invention, that object is attained by connecting bars between motors. In that respect the invention is based on the realization that a stable connection between the individual motors is admittedly required, but it is possible to save on the inherent weight of the platform when using a bar structure. The weight which is saved in that way, with the same carrying capacity on the part of the aircraft, is then available as an additional payload.

In a preferred embodiment of the invention the power supply is implemented by way of at least one trailing cable. In that fashion the aircraft admittedly also has to lift the weight of the cable, but in return for that it does not need to carry costly and heavy energy storage devices. The power supply by way of a plurality of trailing cables which are preferably mounted to various locations on the aircraft means that reliable operation is still possible, even in the event of failure of a cable.

In a particularly preferred feature the aircraft is controlled from the ground by way of a wireless or wired remote control system. In that respect it is also possible to provide two or more remote control systems which act alternately on the aircraft. In that way it is possible to effect rough positioning such as lifting of the load and fundamentally determining the direction of flight from the ground, while fine positioning, for example of a section of the pylon of the installation, is effected from the pylon in a position from which the procedure can be precisely monitored.

In a preferred development of the invention the aircraft has landing feet with which it can be set down on the ground. For that purpose a resiliently mounted support plate is provided at the end of each rotor, which is remote from the shaft.

In a particularly preferred feature the aircraft according to the invention has a device for automatic control of the flight attitude and/or the flight altitude. That device can also be coupled to a GPS system in order in that way to provide for automatically heading for a predeterminable position. In that way rough positioning of the aircraft according to the invention can be effected automatically.

In order to reduce the inherent weight of the aircraft to the minimum possible extent, even when the flight control system is installed on the aircraft, the device is preferably arranged with connecting bars between at least two motors. In that case the device is particularly preferably arranged beneath the plane in which the bars extend between the motors. In that way, even in the case of a flight without a load, the aircraft has a low center of gravity which contributes to the stability of its flight attitude.

In a preferred embodiment the motors and the inverters are structurally combined so that they can be pre-assembled and handled as a unit.

In order to protect the electric cables which are required on the aircraft the connecting bars in a particularly preferred feature are hollow and the cables extend in the interior of the bars.

So that the aircraft can be dimensioned as flexibly as possible and in dependence on the loads to be transported, fixed but releasable connections are provided between the connecting bars and the motors. That permits scaling of the aircraft according to the invention, insofar as, in dependence on the load to be transported, a desired number of motors is selected, the motors then being suitably connected by the connecting bars in the manner of a latticework to afford a stable aircraft.

Advantageous embodiments of the invention are set forth in the appendant claims.

BRIEF DESCRIPTION OF THE SEVERAL VIEWS OF THE DRAWINGS

An embodiment by way of example of the invention is described in greater detail hereinafter with reference to the Figures in which.

DETAILED DESCRIPTION OF THE INVENTION

Figure 1A:
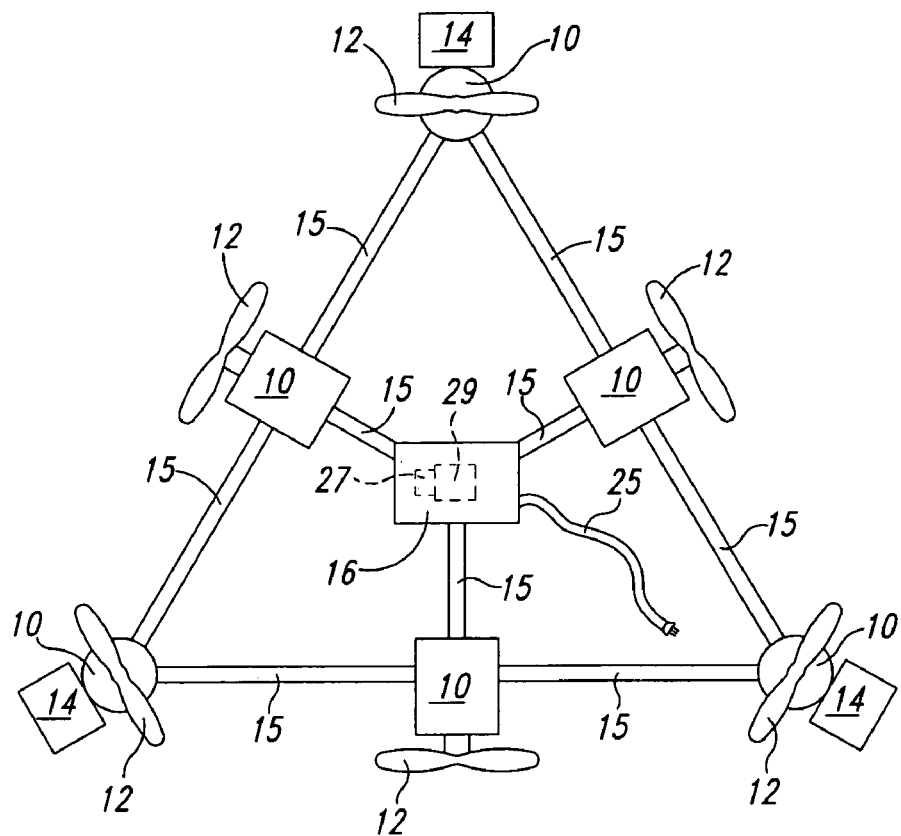
FIG. 1A shows a top side simplified view of an aircraft according to the invention.
Figure 1B:
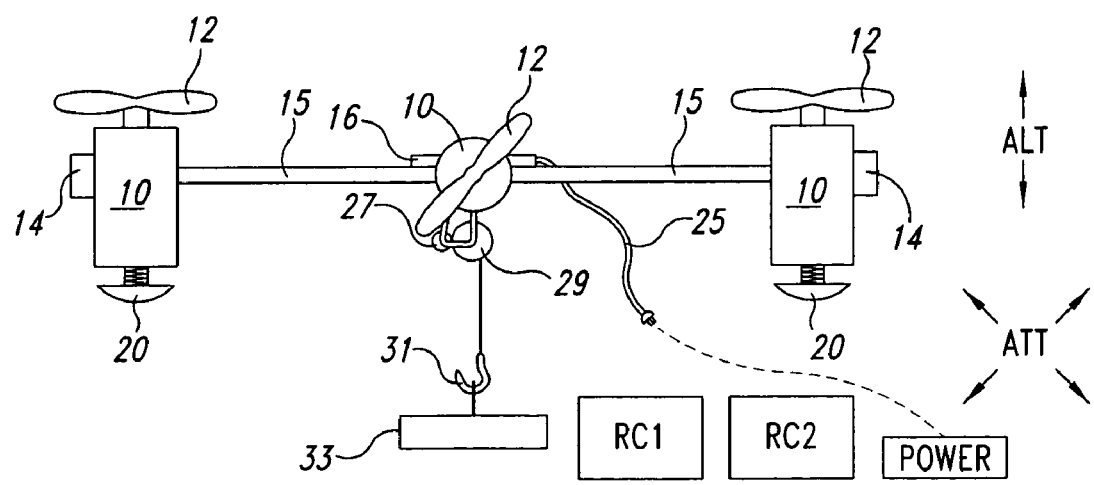
FIG. 1B shows a side elevation view of the aircraft of FIG. 1A.

In FIGS. 1A and 1B, reference 10 denotes a motor, reference 12 denotes the rotor, such as a propeller, reference 14 denotes the inverter, reference 15 denotes a connecting bar and reference 16 denotes a control device for controlling the flight attitude or position, and/or the flight altitude.

The aircraft according to the invention is here shown as being of a triangular basic shape.

Some of the motors 10 are so arranged that the rotor 12 thereof rotates in a vertical plane. Depending on the direction of rotation of the motor 10 such a rotor 12 acts as a pusher rotor or a traction rotor. The direction of flight is accordingly influenced with those rotors.

A power supply cable 25 provides power from the ground to the control device, which provides and controls power to the motors 10 via respective cables 26.

Arranged at the end points of the triangular shape are further motors 10, the rotors 12 of which rotate in a substantially horizontal plane. They operate as lifting rotors and permit lifting of the load or flight at a predeterminable height.

Associated with each motor 10 is an inverter 14 which permits individual actuation of each motor 10. In that way the individual motors 10 can be actuated independently of each other and that therefore permits on the one hand the aircraft to be controlled in a very precise manner while on the other hand it permits the aircraft to be controlled independently of direction.

The triangular shape is only shown as a variant, in this Figure. It will be appreciated that other polygons such as quadrangles, pentagons or any other shapes with a suitable arrangement of motors are possible in order to be able to lift and transport correspondingly large loads.

Provided at the center of the aircraft is a control device 16 which on the one hand feeds electrical energy to the inverters 14 and thus the motors 10 and which on the other hand also influences the inverters 14 in order to produce a flight behavior corresponding to the control commands. It is also possible to integrate into that control device 16 an energy storage device which, for example in the event of a breakage of the trailing cable, still provides sufficient energy for the aircraft to make an emergency landing, in order to avoid an uncontrolled crash.

FIG. 1B shows a lifting system for use with the present invention. An electric motor 27 is provided suspended from the aircraft frame. The electric motor 27 can be suspended from any acceptable part of the frame, for example a central region directly below the control device 16. The electric motor 27 can also be connected to other portions of the aircraft such as a frame coupled to the three corners of the aircraft. Extending below the electric motor 27 is a cable winch 29 and a cable having a hook 31. The cable winch 29 has sufficient cable for extending to the ground when the aircraft is in flight at the expected altitude.

The lift rotors 12 receive power via one or more cables 25 which are coupled to the ground. As the aircraft flies, the electrical power is provided on cables 25 which are connected to coiled wire supplies on the ground. As the aircraft flies upward, the cables 25 will naturally uncurl in order to provide the additional length needed to maintain the aircraft at a correct height above the ground and supply power via the ground connection. This provides the distinct advantage that the power needed to drive the motors 10 does not need to be carried by the aircraft. Instead, substantial weight savings is obtained because the weight of the fuel is not carried by the aircraft. Instead, the load weight can be increased based upon the fact that no fuel needs to be carried by the aircraft.

Of course, other lifting structures besides the winch 29 can be provided on the aircraft. For example, the aircraft may contain one or more platforms for carrying a human operator or workers who will be assisting to assemble the structure being built. It may also include other support platforms.

A control line may be coupled via cable 25, or via wireless to the control device 16 for controlling the aircraft's altitude ALT and also its attitude ATT, such as when carrying a load 33 with the hook 31. The various lift and thrust motors can be controlled via one or more remote control devices RC1 and RC2, each of the devices RC1 and RC2 working either alone to control the device, or simultaneously, in which one of the control devices RC1 controls the lift mechanism and the other control device RC2 controls the directional thrust motors.

Figure 2:
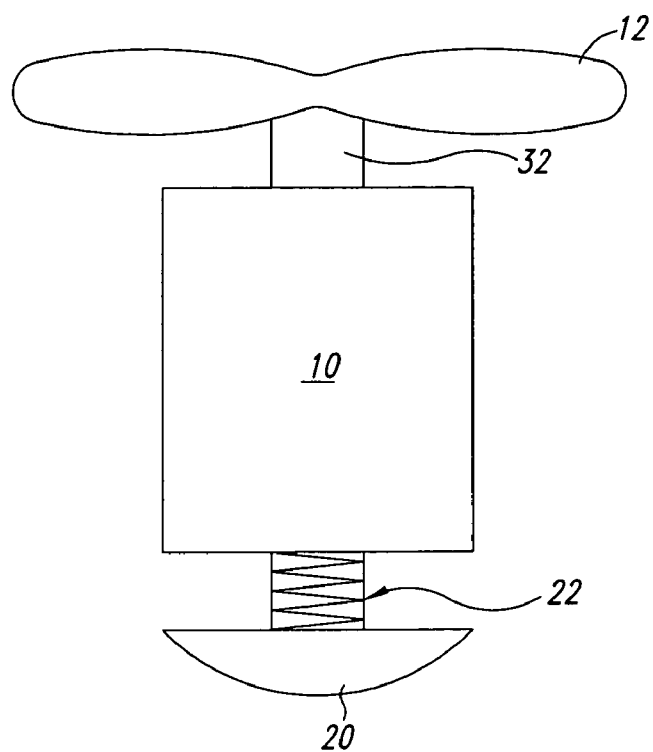
FIG. 2 shows a simplified view of a motor according to the invention of the aircraft.

FIG. 2 shows a side view of a motor 10 according to the invention. A rotor 12 is connected to that motor 10 by way of a shaft. Provided at the end of the motor 10, which is opposite to the shaft 32, is a spring leg 22, with a support foot 20 being mounted to the end of the spring leg 22, which is remote from the motor. According to the position of installation illustrated in this Figure, this involves a lifting motor. When the aircraft according to the invention goes down therefore the support foot 20 will firstly come into contact with the ground and the remaining part of the aircraft will move downwardly against the pressure of the spring leg 22. In that way the aircraft according to the invention can land on the ground without the housing of the motor 10 being exposed to the risk of damage or even only rough dirty contamination.

Figure 3:
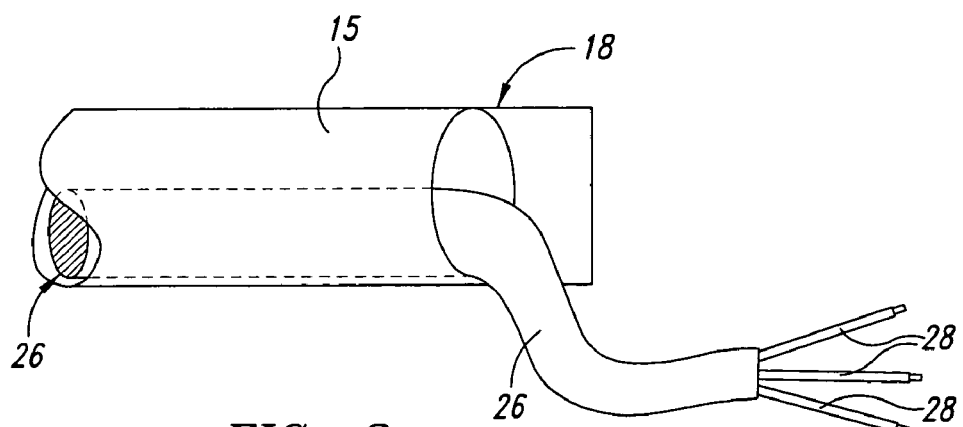
FIG. 3 shows an end portion of a connecting bar according to the invention.

FIG. 3 shows a portion of a connecting bar 15 according to the invention. The connecting bar 15 has a holder 18 with which it can be fixedly but releasably connected for example to a motor 10 in order to be able to construct an aircraft according to the invention. A cable 26 is illustrated within the connecting bar 15 which is of a hollow nature. That arrangement of the cable 26 in the connecting bar 15 provides that the cable is guided in a protected condition within the connecting bar 15 and thus this drastically reduces the risk of damage to the cable 26, such risk being permanently present precisely in the rough conditions of a building site.

The cable 26 issues from the connecting bar 15 at the end thereof and thus near the motor 10 and can be connected with the wires 28. In that way none of cable 26, or in some cases, only a short portion of the cable 26 between the end of the connecting bar 15 and the motor 10 is freely accessible. Here the risk of damage can be reduced by suitably guiding the cable 26 within the frame formed by the aircraft. It will be appreciated that this cable can also be directly connected to the inverter 14 which forms a structural unit with the motor 10.

However, guiding a cable in such a way is also advantageous when the inverter or inverters 14 are associated with the control device 16. In that case the cables 26 run from the control device 16 with the inverters 14 to the motors 10.

In the described aircraft the number of lifting rotors is preferably markedly greater than the number of pusher rotors. For example the ratio of the number of lifting rotors to the thrust rotors can be in the range of between 5:1 and 10:1. Further, the lifting rotors can be of significantly more power than the pusher rotors. The thrusting rotors can be small and positioned to reduce the number needed.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:
1. An aircraft to carry loads, comprising:
   a plurality of lifting rotors and a plurality of thrust rotors;
   a plurality of electric motors, each motor associated with one of the rotors;
   a plurality of inverters, each inverter associated to one of the electric motors, to individually control each electric motor;
   an electric motor-operated cable winch to raise or lower external loads that can be carried by the aircraft;
   at least one connecting bar provided between at least two of the electric motors;
   a lifting cable attachable to an external load, wherein the external load is a component of a building; and
   a spring leg to resiliently mount a support plate to an end of each electric motor respectively associated with each lifting rotor, said support plate being remote from a shaft that connects each electric motor to their associated lifting rotor, wherein when said aircraft lands, said support plate is adapted to come into ground contact and the electric motor having said support plate resiliently mounted thereto moves downwardly against pressure of said spring leg, so as to prevent a housing of said electrical motor from being exposed to ground contact.

2. The aircraft according to claim 1, further comprising at least one trailing cable permanently coupled to a ground and coupled to the aircraft to supply power to the aircraft from the ground.

3. The aircraft according to claim 1, further comprising a wired remote control system.

4. The aircraft according to claim 1, further comprising two remote control systems which can act alternately on the aircraft.

5. The aircraft according to claim 1, further comprising a control device for automatic control of flight attitude.

6. The aircraft according to claim 5, further comprising additional connecting bars between at least two electric motors and the control device.

7. The aircraft according to claim 5, further comprising a GPS system to provide data to the control device to cause the aircraft to head for a predeterminable position.

8. The aircraft according to claim 5 wherein the control device is arranged beneath a plane in which said at least one connecting bar extend between the electric motors.

9. The aircraft according to claim 1 wherein each motor and inverter form a structural combination.

10. The aircraft according to claim 1 wherein said at least one connecting bar is hollow, the aircraft further comprising wires arranged in an interior of the hollow connecting bar to provide electrical power to said electrical motors.

11. The aircraft according to claim 1, wherein said at least one connecting bar is fixedly but releasably connected between the electric motors.

12. The aircraft according to claim 1, further comprising an energy storage device arranged on the aircraft.

13. The aircraft according to claim 1 wherein said at least one connecting bar comprises a plurality of connecting bars, and wherein the aircraft has a chassis which is constructed substantially from said hollow connecting bars.

14. The aircraft according to claim 1 wherein the lifting rotors are substantially double-blade rotors.

15. The aircraft according to claim 1, further comprising a wireless remote control system.

16. The aircraft according to claim 1, further comprising two remote control systems which can act simultaneously on the aircraft.

17. The aircraft according to claim 1, further comprising a control device for automatic control of flight height.

18. The aircraft of claim 1 wherein the at least one connecting bar composes a plurality of connecting bars that together form a generally triangular shape.

19. The aircraft of claim 1 wherein the building is wind power installation.

20. The aircraft of claim 1 wherein the at least one connecting bar comprises a plurality of connecting bars positioned along a periphery of the aircraft to form a polygonal shape.

21. The aircraft of claim 1 wherein each of said lifting rotors provides more power than each one of said thrust rotors.

22. An aircraft, comprising:
   a frame having connecting bars;
   a plurality of electric motors coupled to said connecting bars of the frame;
   at least one lifting rotor mechanically linked to one of the plurality of electric motors;
   a plurality of inverters each associated to one of the electric motors to individually control each electric motor;
   at least one thrusting rotor mechanically linked to one of the plurality of electric motors;
   a lifting cable attachable to a load, wherein the load is a component of a building; and
   a spring leg to resiliently mount a support plate to an end of each electric motor respectively associated with each lifting rotor, said support plate being remote from a shaft that connects each electric motor to their associated lifting rotor, wherein when said aircraft lands, said support plate is adapted to come into ground contact and the electric motor having said support plate resiliently mounted thereto moves downwardly against pressure of said spring leg, so as to prevent a housing of said electrical motor from being exposed to ground contact.

23. The aircraft of claim 22 wherein the cable is mechanically linked to one of the plurality of electric motors to raise and lower the load.

24. The aircraft of claim 22, further comprising a power cable, that can be coupled to a power supply on a ground and to the aircraft, to provide electrical power to the aircraft from the power supply on the ground rather than from an energy storage device carried on the aircraft, if the power cable is coupled to the power supply, the energy storage device carried in the aircraft being capable to provide electrical power to the aircraft if the power cable is decoupled from the power supply, wherein said electrical power provided to the aircraft is carried by wires arranged inside at least one of said connecting bars, which is hollow.

25. The aircraft of claim 22, further comprising one or more control systems to position the aircraft.

26. The aircraft of claim 25 wherein said one of the one or more control systems is wirelessly connected to an input device to send commands to the one of the one or more control systems.

27. The aircraft of claim 25 wherein said one of the one or more control systems comprises a computing system capable of autonomously positioning the aircraft.

28. The aircraft of claim 25, further comprising a Global Positioning System capable of providing data to said one of the one or more control systems.

29. The aircraft of claim 22 wherein said frame having connecting bars comprises a frame constructed substantially from hollow ones of said connecting bars, said hollow connecting bars being fixedly but releasably coupled to said electric motors.

30. The aircraft of claim 29 wherein at least one of the lifting rotor and the plurality of thrusting rotors is connected to the frame.

31. The aircraft of claim 22 wherein the one or more of said plurality of thrusting motors rotates substantially in a vertical plane.

32. The aircraft of claim 22 wherein the frame having the connecting bars together form a generally triangular shape.

33. The aircraft of claim 22 wherein the building is a wind power installation.

34. The aircraft of claim 22 wherein the connecting bars are positioned along a periphery of the frame to form a polygonal shape.

35. The aircraft of claim 22 wherein said at least one lifting rotor provides more power than said at least one thrusting rotor.

* * * * *